United States Patent
Fox et al.

(10) Patent No.: US 7,592,384 B2
(45) Date of Patent: Sep. 22, 2009

(54) ELATOMERIC COMPOSITION CONTAINING MULTIPLE SILANE COUPLING AGENTS

(76) Inventors: Shaun Fox, 3776 Neville Dr., Kent, OH (US) 44240; David R. Stewart, 225 Woodard Ave., Kent, OH (US) 44240

( * ) Notice: Subject to any disclaimer, the term of this patent is extended or adjusted under 35 U.S.C. 154(b) by 0 days.

(21) Appl. No.: 11/647,772

(22) Filed: Dec. 29, 2006

(65) Prior Publication Data

US 2008/0161458 A1  Jul. 3, 2008

(51) Int. Cl.
*B60C 1/00* (2006.01)
*C08K 5/24* (2006.01)

(52) U.S. Cl. ........................ 524/262; 152/450

(58) Field of Classification Search ........... 524/262, 524/493
See application file for complete search history.

(56) References Cited

U.S. PATENT DOCUMENTS

| | | | |
|---|---|---|---|
| 5,605,951 A | 2/1997 | Sandstrom et al. | |
| 5,780,538 A | 7/1998 | Cohen et al. | |
| 5,840,795 A | 11/1998 | Freeman et al. | |
| 5,914,364 A | 6/1999 | Cohen et al. | |
| 6,127,468 A | 10/2000 | Cruse et al. | |
| 6,204,339 B1 * | 3/2001 | Waldman et al. | 525/350 |
| 6,207,720 B1 | 3/2001 | Maeda et al. | |
| 6,310,164 B1 | 10/2001 | Morizono et al. | |
| 6,342,560 B1 | 1/2002 | Okel | |
| 6,414,061 B1 * | 7/2002 | Cruse et al. | 524/262 |
| 6,608,125 B2 * | 8/2003 | Cruse et al. | 524/262 |
| 6,624,230 B2 * | 9/2003 | Luginsland | 524/492 |
| 6,635,700 B2 * | 10/2003 | Cruse et al. | 524/262 |
| 6,683,135 B2 * | 1/2004 | Cruse et al. | 525/100 |
| 6,743,509 B2 | 6/2004 | Bergstrom et al. | |
| 6,777,569 B1 | 8/2004 | Westmeyer et al. | |
| 7,256,231 B2 | 8/2007 | Lin et al. | |
| 7,259,205 B1 * | 8/2007 | Pagliarini et al. | 524/493 |
| 7,271,208 B2 | 9/2007 | Lin et al. | |
| 2002/0055564 A1 | 5/2002 | Cruse et al. | |
| 2002/0055568 A1 * | 5/2002 | Cruse et al. | 524/262 |
| 2002/0099118 A1 * | 7/2002 | Cruse et al. | 524/262 |
| 2002/0115767 A1 * | 8/2002 | Cruse et al. | 524/262 |
| 2003/0083516 A1 | 5/2003 | Korth et al. | |
| 2003/0144394 A1 * | 7/2003 | Penot et al. | 524/262 |
| 2003/0199619 A1 | 10/2003 | Cruse | |
| 2003/0200900 A1 | 10/2003 | Korth et al. | |
| 2003/0225195 A1 * | 12/2003 | Cruse et al. | 524/262 |
| 2004/0210001 A1 * | 10/2004 | Cruse et al. | 525/100 |
| 2004/0220307 A1 | 11/2004 | Wu | |
| 2005/0009955 A1 | 1/2005 | Cohen | |
| 2005/0065265 A1 * | 3/2005 | Zanzig et al. | 524/445 |
| 2005/0148699 A1 * | 7/2005 | Corvasce et al. | 524/47 |
| 2005/0187332 A1 * | 8/2005 | Minagawa et al. | 524/492 |
| 2005/0277717 A1 * | 12/2005 | Joshi et al. | 524/261 |
| 2006/0060285 A1 * | 3/2006 | Weydert et al. | 152/905 |
| 2006/0231181 A1 * | 10/2006 | Roder et al. | 152/154.2 |
| 2007/0093612 A1 * | 4/2007 | Perry et al. | 525/333.9 |
| 2007/0112121 A1 * | 5/2007 | Mabuchi et al. | 524/493 |

FOREIGN PATENT DOCUMENTS

| | | |
|---|---|---|
| EP | 0893245 | 1/1999 |
| EP | 1270657 | 1/2003 |
| WO | 2004/005395 | 1/2004 |
| WO | 2005/007660 | 1/2005 |
| WO | 2005/007661 | 1/2005 |

* cited by examiner

*Primary Examiner*—Mark Eashoo
*Assistant Examiner*—Angela C Scott
(74) *Attorney, Agent, or Firm*—Meredith E. Hooker; Nathan Lewis

(57) ABSTRACT

An elastomeric composition is provided, wherein the composition comprises an elastomer; a reinforcing filler comprising silica; an organosilane polysulfide; and a blocked mercaptosilane, wherein the weight ratio of the blocked mercaptosilane to the organosilane polysulfide is about 0.25:1 to about 5:1. The elastomeric composition may be utilized as a component of a pneumatic tire. Also provided is a method of producing an elastomeric composition, wherein the composition comprises an elastomer; a reinforcing filler comprising silica; an organosilane polysulfide; and a blocked mercaptosilane, wherein the weight ratio of the blocked mercaptosilane to the organosilane polysulfide is about 0.25:1 to about 5:1.

24 Claims, No Drawings

ELATOMERIC COMPOSITION CONTAINING MULTIPLE SILANE COUPLING AGENTS

FIELD OF DISCLOSURE

The disclosure relates to elastomeric compositions containing silica as a reinforcing filler.

BACKGROUND OF DISCLOSURE

Rubber articles that utilize silica as a reinforcing filler, especially tires with tread formulations that contain silica, exhibit reduced hysteresis and better rolling resistance, wet traction, and snow traction when compared to tire treads that contain carbon black as the only filler.

In order to improve the dispersion and processing of silica filled rubber stocks, it has been well known in the art to add silica coupling agents having a moiety (e.g., a silyl group) reactive with the silica surface, and a moiety (e.g., a mercapto, amino, vinyl, epoxy or sulfur group) that binds to the elastomer. Thus, the silica coupler provides a chemical link between the silica filler and the elastomer. Well known examples of such silica coupling agents are organosilane polysulfides, such as bis-(trialkoxysilylorgano) polysulfides, and blocked mercaptosilanes.

However, the use of organosilane polysulfides can lead to increased compound viscosity when mixed at elevated temperatures. In addition, silica stocks that utilize organosilane polysulfides typically have to be processed and formed within a few days after mixing due to an increase in compound viscosity that occurs upon aging. This causes manufacturing inefficiencies.

Blocked mercaptosilanes can offer reduced compound viscosity. As a result, fewer mixing stages may be necessary to achieve the desired compound viscosity. Also, blocked mercaptosilanes offer better stabilization of compound viscosity over time, allowing silica stocks to be stored for longer periods before being processed and formed into a final product.

Although blocked mercaptosilanes offer processing advantages, their cost is substantially high. Furthermore, the level of blocked mercaptosilanes used is typically much higher in comparison to organosilane polysulfides due to a decreased coupling yield, which is caused by the reduced number of alkoxy groups present to react with the silica surface and the reduced number of sulfur atoms to react with the elastomer. The higher dosage amount further exacerbates the cost of blocked mercaptosilanes. Therefore, there remains a need to achieve the processing advantages blocked mercaptosilanes offer at a reduced cost.

SUMMARY OF THE INVENTION

An elastomeric composition is provided, wherein the composition comprises an elastomer; a reinforcing filler comprising silica; an organosilane polysulfide; and a blocked mercaptosilane, wherein the weight ratio of the blocked mercaptosilane to the organosilane polysulfide is about 0.25:1 to about 5:1.

Furthermore, a method of producing an elastomeric composition is provided. The method comprises mixing together (i) an elastomer, (ii) a reinforcing filler comprising silica, (iii) an organosilane polysulfide, and (iv) a blocked mercaptosilane, wherein the weight ratio of the blocked mercaptosilane to the organosilane polysulfide is about 0.25:1 to about 5:1.

Additionally, the resultant elastomeric composition obtained in the above method may be vulcanized by any conventional means, such as adding vulcanization agents and heating, or by ultraviolet radiation.

A pneumatic tire is also provided, wherein the tire comprises a component produced from an elastomeric composition, comprising an elastomer; a reinforcing filler comprising silica; an organosilane polysulfide; and a blocked mercaptosilane, wherein the weight ratio of the blocked mercaptosilane to the organosilane polysulfide is about 0.25:1 to about 5:1.

DETAILED DESCRIPTION

An elastomeric composition is provided, wherein the composition comprises an elastomer; a reinforcing filler comprising silica; an organosilane polysulfide; and a blocked mercaptosilane, wherein the weight ratio of the blocked mercaptosilane to the organosilane polysulfide is about 0.25:1 to about 5:1.

Furthermore, a method of producing an elastomeric composition is provided. The method comprises mixing together (i) an elastomer, (ii) a reinforcing filler comprising silica, (iii) an organosilane polysulfide, and (iv) a blocked mercaptosilane, wherein the weight ratio of the blocked mercaptosilane to the organosilane polysulfide is about 0.25:1 to about 5:1.

Additionally, the resultant elastomeric composition obtained in the above method may be vulcanized by any conventional means, such as adding vulcanization agents and heating, or by ultraviolet radiation.

A pneumatic tire is also provided, wherein the tire comprises a component produced from an elastomeric composition, comprising an elastomer; a reinforcing filler comprising silica; an organosilane polysulfide; and a blocked mercaptosilane, wherein the weight ratio of the blocked mercaptosilane to the organosilane polysulfide is about 0.25:1 to about 5:1.

It has been discovered that the viscosity of an elastomeric composition can be reduced, and/or a mixing stage eliminated, with the use of a mixture of an organosilane polysulfide and a blocked mercaptosilane. The weight ratio of the blocked mercaptosilane to the organosilane polysulfide may be from about 0.25:1 to about 5:1, or from about 0.5:1 to about 4:1, or from about 1:1 to about 3:1. Another way of expressing the amount of blocked mercaptosilane with respect to the organosilane polysulfide is the molar ratio of the silicon atoms between the two coupling agents. The mole ratio of silicon from the blocked mercaptosilane to the silicon from the organosilane polysulfide may be from about 0.18:1 to about 3.8:1, or from about 0.38:1 to about 3:1, and or from about 0.75:1 to about 2.3:1.

The amount of organosilane polysulfide in the elastomeric composition is based on the weight of the silica in the composition. The amount of organosilane polysulfide present in the elastomeric composition may be from about 0.1% to about 20% by weight of silica, or from about 1% to about 15% by weight of silica, or from about 1% to about 10% by weight of silica. Correspondingly, the blocked mercaptosilane is present in an amount based on the weight of organosilane polysulfide in the ratios listed above.

Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis (trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(dit-butylmethoxysilylpropyl)tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide and 3,3'-bis(dimethoxyphenylsilyl-2-methylpropyl)disulfide. Mixtures of various organosilane polysulfide compounds can be used.

Any blocked mercaptosilane may be used, and is not limited to any particular formula. In one embodiment, the blocked mercaptosilane will have an available silyl group for reaction with silica in a silica-silane reaction, and a blocking group (B) that replaces the mercapto hydrogen atom to block the reaction of the sulfur atom with the polymer, as illustrated in the exemplary formula B—S—R—Si—$X_3$.

As an example, R can be a $C_1$ to $C_6$ linear or branched alkylidene, and each X can be independently selected from the group consisting of $C_1$ to $C_4$ alkyl or $C_1$ to $C_4$ alkoxy, such as ethoxy, methoxy, and the like. Blocking groups B can be in the form of an unsaturated heteroatom or carbon bound directly to sulfur via a single bond.

Examples of specific B groups can include, but are not limited to, thiocarboxylate ester, dithiocarbamate ester, thiosulfonate ester, thiosulfate ester, thiophosphate ester, thiophosphonate ester, thiophosphinate ester, and the like. However, these examples are not intended to be limiting, as other suitable chemical structures known to those skilled in the art are intended to fall within the scope of blocked mercaptosilanes that can be used in the elastomeric compositions according to the invention.

Suitable blocked mercaptosilanes include, but are not limited to, 2-triethoxysilyl-1-ethylthioacetate; 2-trimethoxysilyl-1-ethylthioacetate; 2-(methyldimethoxy-silyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiiso-propoxysilylmethylthioacetate; dimethylethoxysilylmethylthioacetate; dimethylmethox-ysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl)-1-ethylthioacetate; 2-(dimethylmethoxysilyl)-1-ethylthioacetate; 2-(dimethylisopropoxysilyl)-1-ethylthioacetate; 3-triethoxysilyl-1-propyl-thioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthio-phosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithio-phosphinate; tris-(3-methyldimethoxysilyl-1-propyl)trithiophosphate; bis-(3-methyl-dimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethyl-thiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercaptosilanes can be used.

A further example of a suitable blocked mercaptosilane is NXT™ silane (3-octanoylthio-1-propyltriethoxysilane), commercially available from GE Silicones.

Any elastomer may be used. Exemplary elastomers include, but are not limited to, natural rubber, polyisoprene, polystyrene, polybutadiene, butadiene-isoprene copolymer, butadiene-isoprene-styrene terpolymer, isoprene-styrene copolymer, and styrene-butadiene copolymer. A mixture of elastomers may be used.

Reinforcing fillers are mixed with the elastomeric composition, such as silica, or a mixture of silica and carbon black. Examples of silica reinforcing filler which can be used in the elastomeric composition include precipitated amorphous silica, wet silica (hydrated silicic acid), dry silica (anhydrous silicic acid), fumed silica, calcium silicate, and the like. Among these, precipitated amorphous wet-process, hydrated silicas are preferred. These silicas are so-called because they are produced by a chemical reaction in water, from which they are precipitated as ultrafine, spherical particles. The surface area, as measured by the BET method, gives the best measure of the reinforcing character of different silicas. Suitable silicas should have a surface area of about 50 $m^2/g$ to about 400 $m^2/g$, or about 100 $m^2/g$ to about 250 $m^2/g$, or about 150 $m^2/g$ to about 220 $m^2/g$. The pH of the silica filler is generally about 5.5 to about 7 or slightly over, or about 5.5 to about 6.8. Some commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). Further examples include Ultrasil® VN2 and Ultrasil® VN3, produced by Degussa Corporation, and Zeosil® 1165 MP, produced by Rhone Poulenc.

Silica can be employed in the amount of about one to about 100 parts by weight per hundred parts of the elastomer (phr), or in an amount of about 5 to about 80 phr, or in an amount of about 30 to about 80 phr. The useful upper range is limited by the high viscosity imparted by fillers of this type.

The elastomeric composition may contain carbon black in a mixture with the silica. The carbon black can be present in amounts ranging from about one to about 80 phr, or from about 5 to about 35 phr. The carbon blacks can include any of the commonly available, commercially-produced carbon blacks. Suitable carbon blacks may have a surface area of at least 60 $m^2/g$, or at least 80 $m^2/g$, or at least 140 $m^2/g$. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used. Typical suitable carbon blacks include N-110, N-220, N-339, N-330, N-351, N-550, N-660, as designated by ASTM D-1765-82a. The carbon blacks utilized in the preparation of the elastomeric composition can be in pelletized form or an unpelletized flocculent mass.

Processing oils can be added to the elastomeric composition. Processing oils may be utilized in the amount of 0 phr to about 70 phr. The processing oil may be added to the composition by itself, or may be added in the form of an oil extended elastomer. Exemplary processing oils include aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), and heavy naphthenics. Suitable MES oils are available commercially as Catenex SNR from Shell, Prorex 15 and Flexon 683 from ExxonMobil, VivaTec 200 from BP, Plaxolene MS from TotalFinaElf, Tudalen 4160/4225 from Dahleke, MES-H from Repsol, MES from Z8, and Olio MES S201 from Agip. Suitable TDAE oils are available as Tyrex 20 from ExxonMobil, VivaTec 500, VivaTec 180 and Enerthene 1849 from BP, and Extensoil 1996 from Repsol. Suitable heavy naphthenic oils are available as Shellflex 794, Ergon Black Oil, Ergon H2000, Cross C2000, Cross C2400, and San Joaquin 2000L.

The elastomeric composition may contain about 0.1 to 10 phr of known vulcanizing agents. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. Suitable vulcanizing agents include "rubbermaker's" soluble sulfur; sulfur donating vulcanizing agents, such as an amine disulfide, polymeric polysulfide or sulfur olefin adducts; insoluble polymeric sulfur; and organic peroxides. The vulcanizing agents are used in an amount ranging from about 0.1 to about 10 phr, or from about 1.5 to about 7.5 phr, or from about 1.5 to about 5 phr.

Accelerators may be used to control the time and/or temperature required for vulcanization and to improve properties of the vulcanizate. Any vulcanization accelerator may be used. Examples include, but are not limited to, thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used may be from about 0.1 to about 5 phr, or from about 0.2 to about 3 phr.

It is readily understood by those having skill in the art that the elastomeric composition may further contain commonly used additive materials such as, for example, activators, retarders, processing additives, oils, resins, plasticizers, pigments, additional fillers, fatty acids, zinc oxide, waxes, antioxidants, anti-ozonants, and peptizing agents. As known to those skilled in the art, depending on the intended use of the elastomeric composition, the additives mentioned above are selected and commonly used in the conventional amounts.

In one embodiment, the elastomeric composition may be prepared by mixing the elastomer(s), filler(s), organosilane polysulfide, blocked mercaptosilane, and, optionally, additives, and vulcanizing agents together. Preferably, the elastomers, fillers, silanes, and additives are mixed in at least one non-productive stage. The temperature achieved during the mixing is at least about 140° C., or at least about 160° C., or at least about 185° C.

After the at least one non-productive mix stage, the elastomeric composition is allowed to cool to a temperature below the temperature attained when mixing the non-productive stage(s). The vulcanizing agents are then mixed with the elastomeric composition in a productive mixing stage, wherein the temperature achieved during mixing is less than the vulcanization temperature of the elastomeric composition.

The elastomeric composition may be utilized as a component of a pneumatic tire, such as a tread or sidewall. To be used as a component of a pneumatic tire, the elastomeric composition is vulcanized. Vulcanization can be accomplished by using the above-described vulcanizing agents and any conventional vulcanization techniques, such as heat or ultraviolet radiation. These methods are well known to those skilled in the art.

EXAMPLES

Four elastomeric compositions were prepared according to the formulations shown in Table 1. The values shown in Table 1 are phr. The Control used only an organosilane polysulfide as the silica coupling agent. Stocks 1-3 used varying blends of a blocked mercaptosilane and an organosilane polysulfide as the silica coupling agents. Specifically, the weight ratio of the blocked mercaptosilane to the organosilane polysulfide in Stocks 1, 2, and 3 were 0.5:1, 1.5:1, and 4.5:1, respectively. The sulfur content was also adjusted to compensate for the total sulfur content of the silane present in the compositions.

The Control and Stocks 1-3 were all mixed in a Banbury mixer. Stocks 1-3 were all mixed in one less stage than the Control stock. Masterbatch 1 was formed by mixing the Masterbatch 1 ingredients together until a temperature of 171° C. was achieved. Masterbatch 2 was formed by mixing the Masterbatch 2 ingredients with Masterbatch 1 until a temperature of 149° C. was achieved. The Control was the only composition that was remilled. The Control was remilled by mixing the Masterbatch 2 in a banbury until a temperature of 143° C. was achieved. The Final Batch was formed by mixing the Masterbatch 2 stocks, or the Remill in the case of the Control, with the Final Batch ingredients until a temperature of 99° C. was achieved.

The test results are shown in Table 2. The tensile properties, such as modulus at 300% elongation, tensile break, and elongation at break were obtained using the standard procedure described in ASTM-D412 at 25° C. All viscoelastic results, such as E' and Tan δ were obtained from a temperature sweep using a spectrometer at a frequency of 50 Hz. A strain of 0.2% was used for the temperature region between −50° C. and −5° C. A strain of 1.0% was used for the temperature region between −5° C. and 60° C.

TABLE 1

Formulations of Elastomeric Compositions

| Component (phr) | Control | Stock 1 | Stock 2 | Stock 3 |
|---|---|---|---|---|
| Masterbatch 1 | | | | |
| Solution SBR[1] | 24 | 24 | 24 | 24 |
| Solution SBR[2] | 46 | 46 | 46 | 46 |
| Natural Rubber | 30 | 30 | 30 | 30 |
| Carbon Black[3] | 33 | 33 | 33 | 33 |
| Silica[4] | 40 | 40 | 40 | 40 |
| Organosilane Polysulfide[5] | 4.4 | 3.3 | 2.2 | 1.1 |
| Blocked Mercaptosilane[6] | | 1.66 | 3.32 | 4.98 |
| Aromatic Oil | 26.25 | 26.25 | 26.25 | 26.25 |
| Plasticizer[7] | 10.5 | 10.5 | 10.5 | 10.5 |
| Processing Aid | 1.5 | 1.5 | 1.5 | 1.5 |
| Microcrystalline Wax | 1.65 | 1.65 | 1.65 | 1.65 |
| Masterbatch 2 | | | | |
| Silica[4] | 15 | 15 | 15 | 15 |
| Stearic Acid | 2 | 2 | 2 | 2 |
| Antiozonant | 1.23 | 1.23 | 1.23 | 1.23 |
| Remill | Masterbatch 2 | None | None | None |

TABLE 1-continued

Formulations of Elastomeric Compositions

| Component (phr) | Control | Stock 1 | Stock 2 | Stock 3 |
|---|---|---|---|---|
| Final Batch | | | | |
| Zinc Oxide | 2.5 | 2.5 | 2.5 | 2.5 |
| Sulfur | 2 | 2.01 | 2.03 | 2.04 |
| DPG[8] | 1 | 1 | 1 | 1 |
| TBBS[9] | 1 | 1 | 1 | 1 |
| MBTS[10] | 0.3 | 0.3 | 0.3 | 0.3 |

[1]Styrene-butadiene copolymer, 34% styrene, 50% vinyl
[2]Styrene-butadiene copolymer, 25% styrene, 15% vinyl
[3]N134 carbon black
[4]Hi-Sil ® 190 (from PPG)
[5]bis-3-triethoxysilylpropyl disulfide
[6]3-octanoylthio-1-propyltriethoxysilane (NXT™ from GE Silicones)
[7]Dioctylphalate
[8]Diphenylguanidine
[9]N-tert-butyl-benzothiazole sulfonamide
[10]2,2'-Dithiobis(benzothiazole)

TABLE 2

Properties of Rubber Stocks

| Property | Control | Stock 1 | Stock 2 | Stock 3 |
|---|---|---|---|---|
| Viscosity (ML1 + 4 @ 130° C.) | 67.6 | 71.1 | 65.9 | 60.5 |
| Mooney Scorch @ 130° C. | 12.0 | 12.1 | 12.3 | 12.6 |
| Modulus @ 300% Elongation (Mpa) | 10.0 | 9.8 | 10.1 | 10.2 |
| Tensile Break (Mpa) | 18.6 | 20.0 | 19.5 | 19.7 |
| Elongation at Break (%) | 502 | 544 | 516 | 525 |
| Tan δ @ 0° C. | 0.507 | 0.489 | 0.498 | 0.507 |
| E' @ 30° C. (Mpa) | 17.6 | 18.1 | 16.4 | 17.0 |
| Tan δ @ 60° C. | 0.268 | 0.261 | 0.251 | 0.261 |

The results of Stock 1 and Stock 2 in Table 2 show that a blend of a blocked mercaptosilane and an organosilane polysulfide can produce elastomeric compositions with a viscosity comparable to the Control, with the advantage of eliminating a mixing stage. Additionally, the results of Stock 3 show that a blend of blocked mercaptosilane and an organosilane polysulfide can offer substantially reduced viscosity, despite the elimination of a mixing stage. Stocks 1, 2, and 3 all had tensile and viscoelastic properties that were comparable to the Control.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An elastomeric composition, comprising:
    (a) an elastomer;
    (b) a reinforcing filler comprising silica;
    (c) an organosilane polysulfide; and
    (d) a blocked mercaptosilane, wherein the weight ratio of the blocked mercaptosilane to the organosilane polysulfide is 1:1 to about 5:1.

2. The elastomeric composition of claim 1, wherein said elastomer is selected from the group consisting of natural rubber, polyisoprene, polystyrene, polybutadiene, butadiene-isoprene copolymer, butadiene-isoprene-styrene terpolymer, isoprene-styrene copolymer, styrene-butadiene copolymer, and mixtures thereof.

3. The elastomeric composition of claim 1, wherein said reinforcing filler comprises a mixture of silica and carbon black.

4. The elastomeric composition of claim 1, wherein said organosilane polysulfide is selected from the group consisting of 3,3'-bis(triethoxysilylpropyl)disulfide, 3,3'-bis(triethoxysilylpropyl)tetrasulfide, and mixtures thereof.

5. The elastomeric composition of claim 1, wherein said blocked mercaptosilane is 3-octanoylthio-1-propyltriethoxysilane.

6. The elastomeric composition of claim 1, wherein said organosilane polysulfide is bis(triethoxysilylpropyl)disulfide, and said blocked mercaptosilane is 3-octanoylthio-1-propyltriethoxysilane.

7. The elastomeric composition of claim 1, wherein the weight ratio of the blocked mercaptosilane to the organosilane polysulfide is about 1.5:1 to about 4.5:1.

8. A method for preparing an elastomeric composition, comprising mixing together (i) an elastomer, (ii) a reinforcing filler comprising silica, (iii) an organosilane polysulfide, and (iv) a blocked mercaptosilane, wherein the weight ratio of the blocked mercaptosilane to the organosilane polysulfide is 1:1 to about 5:1.

9. The method of claim 8, wherein the temperature achieved during mixing is at least about 140° C.

10. The method of claim 8, further comprising mixing said elastomeric composition with a vulcanizing agent.

11. The method of claim 8, wherein said elastomer is selected from the group consisting of natural rubber, polyisoprene, polystyrene, polybutadiene, butadiene-isoprene copolymer, butadiene-isoprene-styrene terpolymer, isoprene-styrene copolymer, styrene-butadiene copolymer, and mixtures thereof.

12. The method of claim 8, wherein said reinforcing filler comprises a mixture of silica and carbon black.

13. The method of claim 8, wherein said organosilane polysulfide is selected from the group consisting of 3,3'-bis(triethoxysilylpropyl)disulfide, 3,3'-bis(triethoxysilylpropyl)tetrasulfide, and mixtures thereof.

14. The method of claim 8, wherein said blocked mercaptosilane is 3-octanoylthio-1-propyltriethoxysilane.

15. The method of claim 8, wherein said organosilane polysulfide is bis(triethoxysilylpropyl)disulfide, and said blocked mercaptosilane is 3-octanoylthio-1-propyltriethoxysilane.

16. The method of claim 8, wherein the weight ratio of the blocked mercaptosilane to the organosilane polysulfide is about 1.5:1 to about 4.5:1.

17. A pneumatic tire comprising a component produced from an elastomeric composition, comprising:
 (a) an elastomer;
 (b) a reinforcing filler comprising silica;
 (c) an organosilane polysulfide; and
 (d) a blocked mercaptosilane silica coupling agent, wherein the weight ratio of the blocked mercaptosilane to the organosilane polysulfide is 1:1 to about 5:1.

18. The pneumatic tire of claim 17, wherein said tire component is selected from the group consisting of tread and sidewall.

19. The pneumatic tire of claim 17, wherein said elastomer is selected from the group consisting of natural rubber, polyisoprene, polystyrene, polybutadiene, butadiene-isoprene copolymer, butadiene-isoprene-styrene terpolymer, isoprene-styrene copolymer, styrene-butadiene copolymer, and mixtures thereof.

20. The pneumatic tire of claim 17, wherein said reinforcing filler comprises a mixture of silica and carbon black.

21. The pneumatic tire of claim 17, wherein said organosilane polysulfide is selected from the group consisting of 3,3'-bis(triethoxysilylpropyl)disulfide, 3,3'-bis(triethoxysilylpropyl)tetrasulfide, and mixtures thereof.

22. The pneumatic tire of claim 17, wherein said blocked mercaptosilane is 3-octanoylthio-1-propyltriethoxysilane.

23. The pneumatic tire of claim 17, wherein said organosilane polysulfide is bis(triethoxysilylpropyl)disulfide, and said blocked mercaptosilane is 3-octanoylthio-1-propyltriethoxysilane.

24. The pneumatic tire of claim 17, wherein the weight ratio of the blocked mercaptosilane to the organosilane polysulfide is about 1.5:1 to about 4.5:1.

\* \* \* \* \*